United States Patent
Murakami

(10) Patent No.: US 9,446,759 B2
(45) Date of Patent: Sep. 20, 2016

(54) CONTROL APPARATUS FOR A HYBRID VEHICLE

(75) Inventor: Koji Murakami, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 142 days.

(21) Appl. No.: 14/356,624

(22) PCT Filed: Nov. 29, 2011

(86) PCT No.: PCT/JP2011/077546
§ 371 (c)(1),
(2), (4) Date: May 7, 2014

(87) PCT Pub. No.: WO2013/080301
PCT Pub. Date: Jun. 6, 2013

(65) Prior Publication Data
US 2014/0288755 A1   Sep. 25, 2014

(51) Int. Cl.
*B60W 20/00* (2016.01)
*B60W 10/08* (2006.01)
*B60W 10/02* (2006.01)
(Continued)

(52) U.S. Cl.
CPC .............. *B60W 20/108* (2013.01); *B60K 6/48* (2013.01); *B60K 6/547* (2013.01); *B60W 10/02* (2013.01); *B60W 10/06* (2013.01); *B60W 10/08* (2013.01); *B60W 20/00* (2013.01); *B60W 20/40* (2013.01); *B60K 2006/4808* (2013.01); *B60W 2030/206* (2013.01); *B60W 2510/0623* (2013.01); *B60Y 2300/46* (2013.01); *Y02T 10/626* (2013.01); *Y02T 10/6221* (2013.01); *Y02T 10/6286* (2013.01); *Y02T 10/7258* (2013.01); *Y10S 903/93* (2013.01)

(58) Field of Classification Search
CPC ........... Y10S 903/905; Y10S 903/906; F02D 41/042; B60W 10/02; B60W 10/06; B60W 10/08; B60W 20/00; B60W 20/108; B60W 20/40; B60K 6/48; B60K 6/547
See application file for complete search history.

(56) References Cited

U.S. PATENT DOCUMENTS 6,840,341 B2 * 1/2005 Fujikawa ............... B60K 6/365
                                                                  180/65.25
8,626,426 B2 * 1/2014 Ohmori ................... B60T 7/122
                                                                  123/179.4
(Continued)

FOREIGN PATENT DOCUMENTS

CN        101365613 A       2/2009
JP        2004-245325       9/2004
(Continued)

*Primary Examiner* — Tuan C. To
(74) *Attorney, Agent, or Firm* — Finnegan, Henderson, Farabow, Garrett & Dunner, LLP

(57) ABSTRACT

A control apparatus (100) is a control apparatus for a hybrid vehicle (10), wherein the hybrid vehicle is provided with an engine (200) which operates by a burning of fuel and a rotating electrical machine (Mg) which operates by using electric power charged in a battery, the control apparatus is provided with: a stop controlling device which stops a supply of the fuel to the engine while the hybrid vehicle is running; a vibration suppress controlling device which controls the rotating electrical machine so as to generate a suppress force for suppressing vibration which is caused by a stop of the supply of the fuel to the engine; and an adjusting device which adjusts magnitude of the suppress force such that the magnitude of the suppress force becomes smaller as a braking amount for braking the hybrid vehicle becomes larger.

6 Claims, 7 Drawing Sheets

(51) Int. Cl.
*B60W 10/06* (2006.01)
*B60K 6/48* (2007.10)
*B60K 6/547* (2007.10)
*B60W 30/20* (2006.01)

(56) References Cited

U.S. PATENT DOCUMENTS

| | | | | |
|---|---|---|---|---|
| 8,838,366 | B2* | 9/2014 | Suyama | B60K 6/387 477/168 |
| 8,838,368 | B2* | 9/2014 | Mitsui | F02D 9/02 123/179.4 |
| 2007/0270281 | A1* | 11/2007 | Inoue | B60W 10/02 477/180 |
| 2009/0030595 | A1 | 1/2009 | Sugai | |
| 2009/0037081 | A1* | 2/2009 | Santou | F02D 41/123 701/104 |
| 2010/0168943 | A1* | 7/2010 | Fukushiro | B60K 6/46 701/22 |
| 2010/0286858 | A1* | 11/2010 | Otokawa | B60K 6/365 701/22 |
| 2012/0116653 | A1* | 5/2012 | Hozumi | F02D 17/04 701/103 |
| 2012/0323425 | A1* | 12/2012 | Suyama | B60K 6/387 701/22 |
| 2013/0030624 | A1* | 1/2013 | Suyama | B60K 6/387 701/22 |

FOREIGN PATENT DOCUMENTS

| | | |
|---|---|---|
| JP | 2005-315358 | 11/2005 |
| JP | 2010-137652 | 6/2010 |

* cited by examiner (a)

(b)

(a)

(b)

CONTROL APPARATUS FOR A HYBRID VEHICLE

CROSS-REFERENCE TO RELATED APPLICATIONS

This application is a national phase application of International Application No. PCT/JP2011/077546, filed Nov. 29, 2011, the content of which is incorporated herein by reference.

TECHNICAL FIELD

The present invention relates to a control apparatus for a hybrid vehicle, for example.

BACKGROUND ART

A hybrid vehicle which is provided with both of an engine and a motor generator as power sources for a drive is known. On this type of the hybrid vehicle, a control to stop a supply of fuel to the engine is sometimes used when a predetermined condition (for example, a condition in which a driver does not require acceleration) is satisfied during the drive, in order to improve fuel consumption (for example, see a patent document 1). In this case, torque which is generated from the engine varies (specifically, decreases) with the stop of the supply of the fuel. As a result, a vibration sometimes occurs due to the variation of the torque. This vibration may lead to deterioration of drivability.

Therefore, in the patent document 1, a vibration suppression control which uses torque outputted from the motor generator is proposed, in order to control effect of the variation of the torque (in other words, the vibration) with the stop of the supply of the fuel. Namely, in the patent document 1, the vibration suppression control, which cancels out the vibration due to the variation of the torque of the engine with the stop of the supply of the fuel by outputting the torque whose phase is opposite to a phase of the variation of the torque of the engine with the stop of the supply of the fuel from the mother generator, is proposed. Incidentally, the vibration suppression control may be used not only for the purpose of controlling the vibration due to the variation of the torque of the engine disclosed in the patent document 1, but also for the purpose of controlling vibration caused by impact of shift change in a transmission.

BACKGROUND ART DOCUMENT

Patent Document

Patent document 1: Japanese Patent Application Laid Open No. 2010-137652
Patent document 2: Japanese Patent Application Laid Open No. 2005-315358
Patent document 3: Japanese Patent Application Laid Open No. 2004-245325

DISCLOSURE OF INVENTION

Subject to be Solved by the Invention

However, when the motor generator operates to control the vibration due to the variation of the torque of the engine, SOC (State of Charge) of a battery decreases. Therefore, it is preferable to reduce a frequency or a period at which the motor generator operates for the vibration suppression control as soon as possible, from a view point of maintaining the SOC of the battery.

On the other hand, in decelerating, the hybrid vehicle sometimes charges the battery by regeneration of electric power in the motor generator while the engine stops. However, if the SOC is relatively high, the engine does not stop sometimes because the battery cannot be charged. Even in this case, it is preferable to stop the supply of the fuel to the engine for the purpose of improving the fuel consumption. However, the vibration due to the variation of the torque of the engine with the stop of the supply of the fuel in decelerating varies depending on an aspect of the deceleration. For example, depending on the aspect o the deceleration, the vibration suppression control by the motor generator may be excessively performed, and the SOC excessively decreases as a result.

In view of the aforementioned problem, it is therefore an object of the present invention to provide, for example, a control apparatus for a hybrid vehicle which is configured to appropriately suppress the vibration caused with the stop of the supply of the fuel even when the hybrid vehicle decelerates.

Means for Solving the Subject

In order to solve the above object, a control apparatus for a hybrid vehicle of the present invention is a control apparatus for a hybrid vehicle, wherein the hybrid vehicle is provided with an engine which operates by a burning of fuel and a rotating electrical machine which operates by using electric power charged in a battery, the control apparatus being provided with: a stop controlling device which stops a supply of the fuel to the engine while the hybrid vehicle is running; a vibration suppress controlling device which controls the rotating electrical machine so as to generate a suppress force for suppressing vibration which is caused by a stop of the supply of the fuel to the engine; and an adjusting device which adjusts magnitude of the suppress force such that the magnitude of the suppress force becomes smaller as a braking amount for braking the hybrid vehicle becomes larger.

According to the control apparatus for the hybrid vehicle of the present invention, the stop controlling device stops the supply of the fuel to the engine. The stop of the supply of the fuel based on control of the stop controlling device is performed for the purpose of improving fuel consumption. Therefore, it is preferable that the stop controlling device stop the supply of the fuel while the hybrid vehicle is running. In addition, it is preferable that the stop of the supply of the fuel based on control of the stop controlling device would not cause adverse effect on a usual drive of the hybrid vehicle. Thus, it is preferable that the stop controlling device operate when a condition (for example, a condition in which a driver does not require acceleration) determined in advance in a view point of not causing the adverse effect on the usual drive of the hybrid vehicle is satisfied.

If the stop controlling device stops the supply of the fuel to the engine, a torque which is generated by the engine varies (for example, decreases). As a result, a vibration due to the variation of the torque sometimes occurs. This vibration is not only generated in the engine but also sometimes transmitted to the hybrid vehicle via a drive shaft and the like from the engine. Therefore, this vibration may lead to deterioration of drivability. In the present embodiment, in order to suppress (specifically, rid or reduce) this vibration, a control of the vibration suppress controlling device is performed. Specifically, the vibration suppress controlling device controls the rotating electrical machine so as to generate the suppress force for suppressing the vibration which is caused by the stop of the supply of the fuel to the engine (alternatively, the variation of the torque of the engine, which causes this vibration, with the stop of the supply of the fuel to the engine). As a result, the vibration which is caused by the stop of the supply of the fuel to the engine is canceled out or reduced by the suppress force generated by the rotating electrical machine. Thus, the vibration which is caused by the stop of the supply of the fuel to the engine is suppressed.

Especially in the present embodiment, the adjusting device adjust the magnitude of the suppress force depending on the braking amount for braking the hybrid vehicle. More specifically, the adjusting device adjusts the magnitude of the suppress force such that the magnitude of the suppress force becomes smaller as the braking amount becomes larger. In other words, the adjusting device adjust the magnitude of the suppress force such that the magnitude of the suppress force becomes smaller in the case where the braking amount is relatively large, compared to the case where the braking amount is relatively small. Namely, the adjusting device adjusts the magnitude of the suppress force such that the magnitude of the suppress force becomes larger as the braking amount becomes smaller. In other words, the adjusting device adjust the magnitude of the suppress force such that the magnitude of the suppress force becomes larger in the case where the braking amount is relatively small, compared to the case where the braking amount is relatively large.

The hybrid vehicle typically decelerates when an operation to put a brake on the hybrid vehicle is performed. Here, an aspect of the vibration which is caused by the stop of the supply of the fuel to the engine varies depending on an aspect of the deceleration, when the hybrid vehicle decelerates. Specifically, the vibration which is caused by the stop of the supply of the fuel to the engine becomes smaller in the case where the hybrid vehicle decelerates relatively strongly, compared in the case where the hybrid vehicle decelerates relatively weakly. A degree of the deceleration correlates with a degree of the braking amount, and thus the vibration which is caused by the stop of the supply of the fuel to the engine becomes smaller in the case where the braking amount is relatively large, compared to the case where the braking amount is relatively small. In other words, the vibration which is caused by the stop of the supply of the fuel to the engine becomes larger in the case where the hybrid vehicle decelerates relatively weakly, compared to the case where the hybrid vehicle decelerates relatively strongly. Namely, the vibration which is caused by the stop of the supply of the fuel to the engine becomes larger in the case where the braking amount is relatively small, compared to the case where the braking amount is relatively large. The change of the aspect of the vibration easily occurs especially immediately before the hybrid vehicle stops.

Considering the relationship between the aspect of the deceleration and the aspect of the vibration which is caused by the stop of the supply of the fuel to the engine, the suppress force is not unnecessarily so large in the case where the braking amount is relatively large (namely, the vibration which is caused by the stop of the supply of the fuel to the engine is relatively small), compared to the case where the braking amount is relatively small (namely, the vibration which is caused by the stop of the supply of the fuel to the engine is relatively large). On the other hand, the suppress force is preferably large to some extent in the case where the braking amount is relatively small (namely, the vibration which is caused by the stop of the supply of the fuel to the engine is relatively large), compared to the case where the braking amount is relatively large (namely, the vibration which is caused by the stop of the supply of the fuel to the engine is relatively small). From such a view point, the adjusting device adjust the magnitude of the suppress force such that the suppress force becomes smaller as the braking amount becomes larger.

Due to such an operation of the adjusting device, it is appropriately prevented that the rotational electrical machine adds the excessive large suppress force in the case where the vibration which is caused by the stop of the supply of the fuel to the engine is relatively small. Thus, a charge state of a battery for operating the rotational electrical machine which generates the suppress force is not deteriorated beyond necessity or unnecessarily. As described above, according to the control apparatus of the present invention, the vibration which is caused by the stop of the supply of the fuel can be appropriately suppressed even when the hybrid vehicle decelerates. Namely, according to the control apparatus of the present invention, the vibration which is caused by the stop of the supply of the fuel when the hybrid vehicle decelerates can be appropriately suppressed without deteriorating the charge state of the battery beyond necessity or unnecessarily.

Incidentally, the "magnitude of the suppress force" means an average or total magnitude of the suppress force. Thus, it is enough that the average or total magnitude of the suppress force in the case where the braking amount is relatively large just becomes smaller than the average or total magnitude of the suppress force in the case where the braking amount is relatively small, by the adjustment of the magnitude of the suppress force by the adjusting device. Namely, it does not necessarily mean that the magnitude of the suppress force in the case where the braking amount is relatively large always becomes smaller than the magnitude of the suppress force in the case where the braking amount is relatively small. As one example of a method of adjusting the magnitude of the suppress force in such an aspect, a below described adjustment of a suppress gain (alternatively, opposite phase gain) is included.

Moreover, the "braking amount" means an arbitrary parameter which can specify an aspect of the braking of the hybrid vehicle (what is called, an operation for suppressing or controlling vehicle speed and the like which is represented by the brake). As one example of such a "braking amount", a below described operational amount of a brake pedal is included. Therefore, as one example of a condition in which "the braking amount is relatively large", a condition in which the operational amount of the brake pedal is relatively large is included. In a same manner, as one example of a condition in which "the braking amount is relatively small", a condition in which the operational amount of the brake pedal is relatively small is included.

In another aspect of the control apparatus for the hybrid vehicle of the present invention, the adjusting device adjusts the magnitude of the suppress force such that the magnitude of the suppress force becomes zero if the braking amount is equal to or more than a predetermined amount.

According to this aspect, it is appropriately prevented that the rotational electrical machine adds the excessive large suppress force in the case where the vibration which is caused by the stop of the supply of the fuel to the engine is relatively small (namely, in the case where the braking amount is relatively large). Thus, the control apparatus in this aspect can receive the above described effect appropriately.

In another aspect of the control apparatus for the hybrid vehicle of the present invention, the suppress force is calculated by multiplying suppress torque whose phase is opposite to a phase of a variation of a torque of the engine with the stop of the supply of the fuel to the engine by a suppress gain which determines the magnitude of the suppress force, the adjusting device adjusts the magnitude of the suppress force by adjusting the suppress gain such that the suppress gain becomes smaller as the braking amount becomes larger.

According to this aspect, it is possible to adjust the magnitude of the suppress force relatively easily by adjusting the suppress gain which determines the magnitude of the suppress force, while it is possible to receive the above described effect.

In an aspect of the control apparatus which adjust the suppress gain as described above, the adjusting device may be configured to adjust the magnitude of the suppress force by adjusting the suppress gain such that the suppress gain becomes zero if the braking amount is equal to or more than a predetermined amount.

By such a configuration, it is possible to adjust the magnitude of the suppress force relatively easily by adjusting the suppress gain which determines the magnitude of the suppress force, while it is possible to receive the above described effect.

In another aspect of the control apparatus for the hybrid vehicle of the present invention, the hybrid vehicle is further provided with a clutch mechanism which couples and uncouples a connection between the engine and a drive shaft which transmits a driving power of the engine to a wheel of the hybrid vehicle, the control apparatus further comprises a clutch controlling device which controls the clutch mechanism to uncouple the connection between the engine and the drive shaft when the rotating electrical machine cannot generate the suppress force by the control of the vibration suppress controlling device, the clutch controlling device adjusts a timing when the connection between the engine and the drive shaft is uncoupled depending on the braking amount.

According to this aspect, even when the rotating electrical machine cannot generate the suppress force due to some kind of reason, the clutch mechanism is controlled by the clutch controlling device to uncouple the connection between the engine and the drive shaft. As a result, the vibration which is caused by the stop of the supply of the fuel to the engine is not transmitted from the engine to the drive shaft (furthermore, to the hybrid vehicle). Therefore, a state which is substantially same as a state in which the vibration which is caused by the stop of the supply of the fuel to the engine is suppressed is realized, for the driver of the hybrid vehicle.

Here, as described above, the aspect of the vibration which is caused by the stop of the supply of the fuel to the engine varies depending on the aspect of the deceleration. Thus, for example, it is considered that the vibration which is caused by the stop of the supply of the fuel to the engine is not easily transmitted to the driver even if the connection between the engine and the drive shaft is not uncoupled or is not uncoupled so early in the case where the braking amount is relatively large (namely, the vibration which is caused by the stop of the supply of the fuel to the engine is relatively small). Alternatively, it is considered that it is preferable that the vibration which is caused by the stop of the supply of the fuel to the engine be not transmitted to the to driver by uncoupling the connection between the engine and the drive shaft relatively early in the case where the braking amount is relatively small (namely, the vibration which is caused by the stop of the supply of the fuel to the engine is relatively large).

From such a view point, the clutch controlling device adjusts the timing when the connection between the engine and the drive shaft is uncoupled depending on the braking amount. By such an operation of the clutch controlling device, it is appropriately prevented that the connection between the engine and the drive shaft is uncoupled so early beyond necessity even in the case where the vibration which is caused by the stop of the supply of the fuel to the engine is relatively small. Thus, the engine, which is desirable to start up with the uncoupling of the connection between the engine and the drive shaft, also does not start up so early beyond necessity. Therefore, even in the case where the vibration which is caused by the stop of the supply of the fuel to the engine is suppressed by uncoupling the connection between the engine and the drive shaft, the fuel consumption can be improved to a certain extent by the stop of the supply of the fuel.

Incidentally, as described below, the timing when the connection between the engine and the drive shaft is uncoupled is often arbitrarily determined in accordance with whether or not driving state of the hybrid vehicle satisfies a predetermined condition. The clutch controlling device may directly adjust the timing arbitrarily determined in such a manner, or may change the predetermined condition which is used to determine the timing and thus indirectly adjust the timing arbitrarily determined from the changed condition. For example, the clutch controlling device may adjust a default timing which is determined arbitrarily or in advance so as to advance or delay it, or may change the predetermined condition such that it is restricted or loosen and thus indirectly adjust the timing arbitrarily determined from the changed predetermined condition.

In an aspect of the control apparatus which is provided with the clutch controlling device as described above, the clutch controlling device may be configured to adjust the timing when the connection between the engine and the drive shaft is uncoupled such that the timing when the connection between the engine and the drive shaft is uncoupled gets delayed more as the braking amount becomes larger.

By such a configuration, it is appropriately prevented that the connection between the engine and the drive shaft is uncoupled so early beyond necessity even in the case where the vibration which is caused by the stop of the supply of the fuel to the engine is relatively small. Thus, the control apparatus in this aspect can appropriately receive the above various effects.

The operation and other advantages of the present invention will become more apparent from embodiments explained below.

MODE FOR CARRYING OUT THE INVENTION

Hereinafter, embodiments of the present invention will be explained with reference to the drawings.

Figure 1:
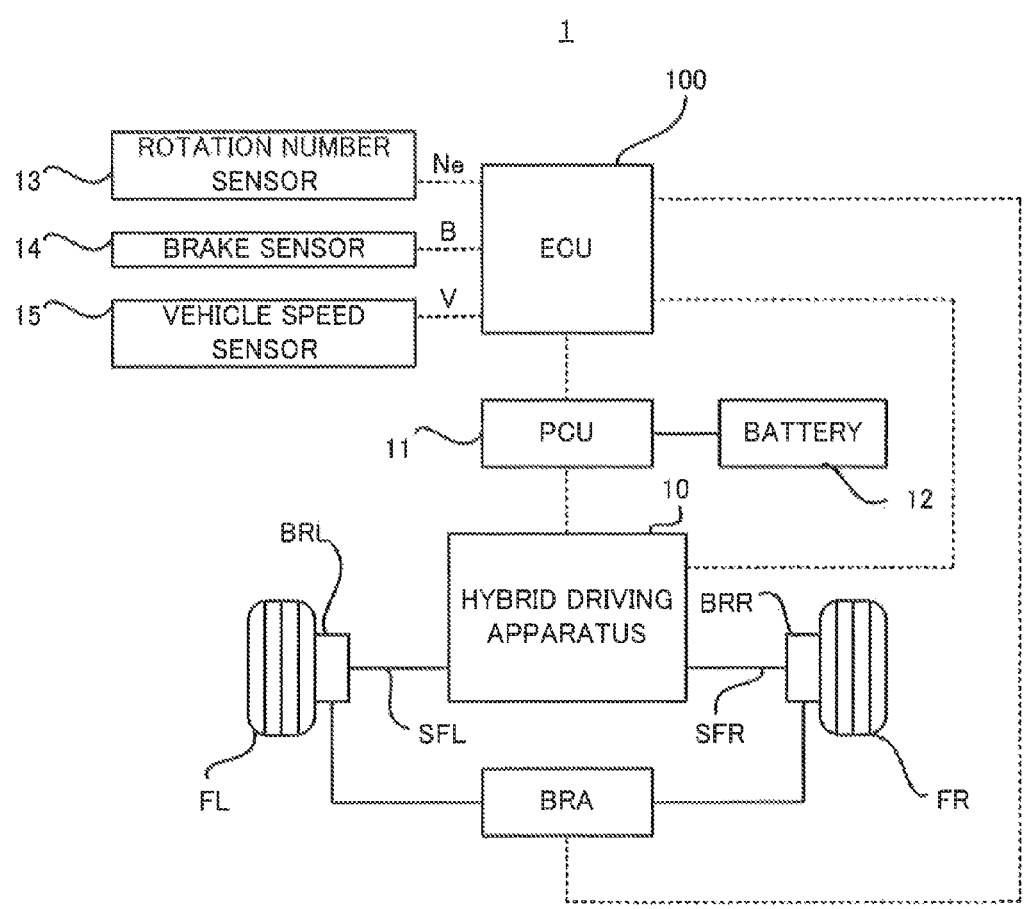
FIG. 1 is a block diagram illustrating one example of a configuration of a hybrid vehicle of the present embodiment.

(1) Configuration of Hybrid Vehicle (1-1) Entire Configuration of Hybrid Vehicle Firstly, a configuration of a hybrid vehicle 1 of the present embodiment will be explained with reference to FIG. 1. FIG. 1 is a block diagram illustrating one example of the configuration of the hybrid vehicle 1 of the present embodiment.

As illustrated in FIG. 1, the hybrid vehicle 1 is provided with: an ECU (Electronic Control Unit) 100; a PCU (Power Control Unit) 11, a battery 12; a rotation number sensor 13; a brake sensor 14; a vehicle speed sensor 15; a brake actuator BRA; a right brake apparatus BRR; a left brake apparatus BRL; and a hybrid driving apparatus 10.

The ECU 100 is provided with a CPU (Central Processing Unit), a ROM (Read Only Memory), a RAM (Random Access Memory) and the like, and is an electrical control unit which is configured to control an operation of each unit of the hybrid vehicle 1. The ECU 100 is one example of the "control apparatus" of the present invention. The ECU 100 is configured to be able to perform a fuel cut control process and a vibration suppress control process which are described below, in accordance with a control program which is stored in the ROM.

Incidentally, the ECU 100 is a single electrical control unit which is configured to function as one example of each of the "stop controlling device", the "vibration suppress controlling device", the "adjusting device" and the "clutch controlling device" of the present invention. All of the operations of the "stop controlling device", the to "vibration suppress controlling device", the "adjusting device" and the "clutch controlling device" are configured to be performed by the ECU 100. However, a physical, mechanical and electrical configurations of the "stop controlling device", the "vibration suppress controlling device", the "adjusting device" and the "clutch controlling device" are not limited to this configuration. For example, the "stop controlling device", the "vibration suppress controlling device", the "adjusting device" and the "clutch controlling device" can be configured as a plurality of the ECUs, some kind of processing unit, some kind of controller or some kind of computer system such as a microcomputer apparatus and the like.

The hybrid driving apparatus 10 is a driving unit which drives (operates) the hybrid vehicle 1 by supplying driving torque as driving power to a left axle shaft SFL (corresponding to left front wheel FL) and a right axle shaft SFR (corresponding to right front wheel FR) which are axle shafts of the hybrid vehicle 1. The detailed configuration of the hybrid driving apparatus 10 will be described later.

The PCU 11 is a control unit which is configured to control an input and an output of electric power between a below described motor generator MG and the battery 12. The PCU 11 includes a not-illustrated inverter which is configured to convert AC (analog current) electric power extracted from the battery 12 into DC (direct current) electric power and then supply it to the below described motor generator MG and to convert DC electric power as regenerated electric power (generated electric power) of the motor generator MG to AC electric power and then supply it to the batter 12. Moreover, the PCU 11 is electrically connected to the ECU 100 and its operation is controlled by the ECU 100.

The battery 12 is a battery unit which has a configuration in which a plurality of (for example, 100 pieces of) unit battery cells such as lithium ion battery cells are serially connected and which functions as electrical power supply source for the motor generator MG.

The rotation number sensor 13 is a sensor for detecting rotation number Ne of a below described engine 200. The rotation sensor 13 is electrically connected to the ECU 100 and the detected rotation number Ne is referred by the ECU 100 in a regular or irregular cycle.

The brake sensor 14 is a sensor for detecting an operational amount B of a not-illustrated brake pedal of the hybrid vehicle 1. The brake sensor 14 is electrically connected to the ECU 100 and the detected operational amount B is referred by the ECU 100 in a regular or irregular cycle. Incidentally, the brake sensor 14 may detect a parameter which can directly or indirectly specify an aspect of the brake realized by the operation of the brake pedal, in addition to or instead of the operational amount B of the brake pedal. As one example of the parameter which can directly or indirectly specify an aspect of the brake, magnitude of brake force (in other words, braking force), a period during which the brake is operated and the like are included.

The vehicle speed sensor 15 is a sensor for detecting vehicle speed V of the hybrid vehicle 1. The vehicle speed sensor 15 is electrically connected to the ECU 100 and the detected vehicle speed V is referred by the ECU 100 in a regular or irregular cycle.

The left brake apparatus BRL is an apparatus which can add the brake force (for example, friction brake force) to the left front wheel FL via a brake element such as a brake pad and the like. Brake torque which determines the brake force of the left brake apparatus BRL is configured to change in accordance with pressure of brake fluid which is supplied from the brake actuator BRA to a wheel cylinder of each wheel.

The right brake apparatus BRR is an apparatus which can add the brake force (for example, friction brake force) to the right front wheel FR via a brake element such as a brake pad and the like. Brake torque which determines the brake force of the right brake apparatus BRR is configured to change in accordance with pressure of brake fluid which is supplied from the brake actuator BRA to a wheel cylinder of each wheel.

The brake actuator BRA is provided with a master cylinder which is connected to the not-illustrated brake pedal, a brake fluid pipe which extends from the master cylinder to each wheel cylinder, an electromagnetic valve which is provided on the brake fluid pipe as occasion demand, an electric oil pomp apparatus and the like. The brake actuator BRA is an actuator which can perform a control of increasing/decreasing the pressure of the brake fluid via the electric oil pump, a control of a pressure of oil supplied to each wheel cylinder via the open/close control of each electromagnetic valve and the like. The brake actuator BRA is electrically connected to the ECU 100 and the brake torque of each of the above described left brake apparatus BRL and the right brake apparatus BRR is controlled by the ECU 100. Incidentally, the brake actuator BRA may be an actuator which configures a well known ECB (Electric Control Braking system).

(1-2) Detailed Configuration of Hybrid Driving Apparatus

Figure 2:
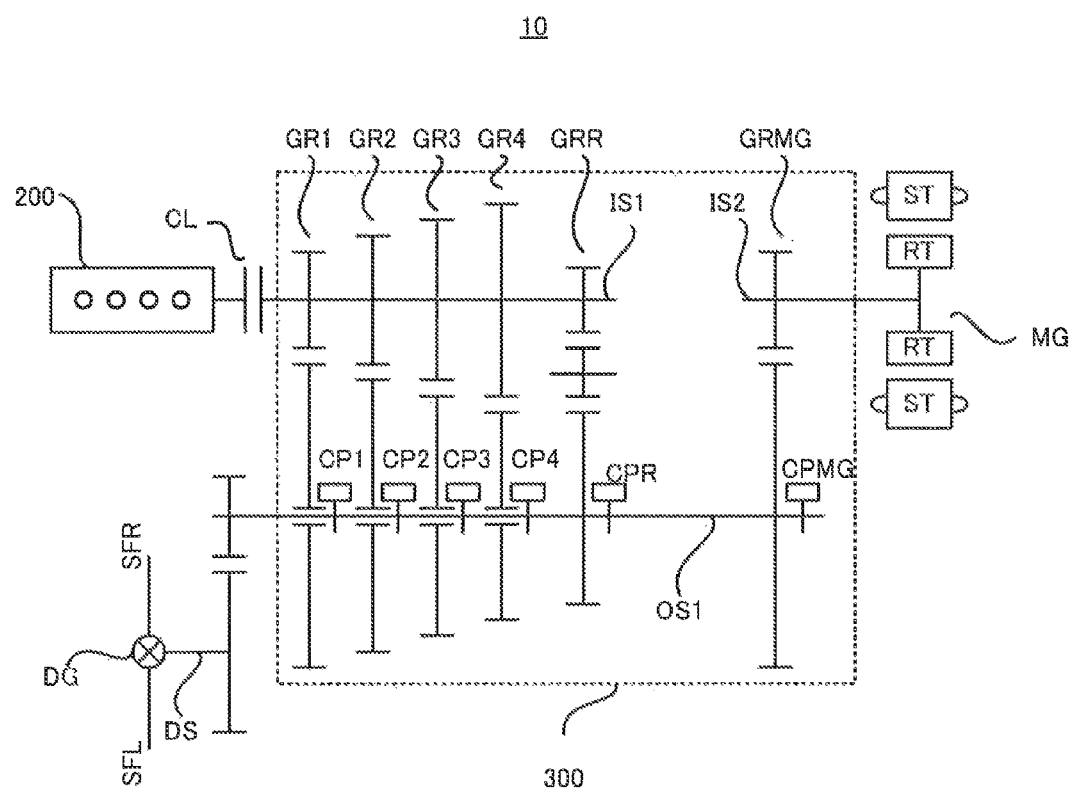
FIG. 2 is a block diagram illustrating one example of a configuration of a hybrid driving apparatus.

Next, a detailed configuration of the hybrid driving apparatus 10 which the hybrid vehicle 1 is provided with will be explained with reference to FIG. 2. FIG. 2 is a block diagram illustrating one example of the configuration of the hybrid driving apparatus 10. Incidentally, regarding a configuration which is same as the configuration illustrated in FIG. 1, same reference number is added and its detailed explanation is omitted.

As illustrated in FIG. 2, the hybrid driving apparatus 10 is provided with the engine 200, the motor generator MG, a clutch CL and a transmission mechanism 300.

The engine 200 is one example of the "engine" of the present invention and is a gasoline engine which functions as a main power source of the hybrid vehicle 1. The engine 200 is a well known gasoline engine and its detailed explanation is omitted here. A not-illustrated crank shaft which is an engine output shaft of the hybrid vehicle 1 is connected to a clutch plate (its reference number is omitted) of the clutch CL. If the clutch CL is in the coupled state (engaged state), engine torque Te which is output torque of the engine 200 is transmitted to an input shaft IS1 of the transmission mechanism 300 via the clutch CL in the coupled state.

If the engine torque Te is transmitted to the input shaft IS1, the engine torque Te is converted in accordance with a gear unit of the transmission mechanism 300 and is outputted from an output shaft OS1 of the transmission mechanism 300. The engine torque Te outputted from the output shaft OS1 is outputted to the left axle shaft SFL and the right axle shaft SFR via some kind of gear apparatus, a drive shaft DS and a differential DG. Incidentally, although the hybrid driving apparatus 10 of the present embodiment is provided with an automated manual transmission (AMT), it may be provided with another transmission such as a dual clutch transmission (DCT) and the like. However, it is preferable that the transmission mechanism 300 be connected to the crank shaft of the engine 200 via the clutch CL which can automatically operates even when the rotation number Ne of the engine 200 becomes very small.

Incidentally, the engine 200 is only one example of a practical aspect which the engine can use. Not only the engine 200 but also a well know engine can be used as the practical aspect of the engine.

The motor generator MG is one example of the "rotating to electrical machine" of the present invention, and has a power running function which transforms electric energy into motion energy and a regenerating function which transforms motion energy into electric energy. The motor generator MG is a synchronous electric motor (in other words, a synchronous rotating electrical machine), and is provided with a rotor RT which has a plurality of permanent magnets on its outer surface and a stator ST to which a three-phase coil for generating rotating magnetic field is wound. However, the motor generator MG may be a rotating electrical machine whose configuration is different from the synchronous electric motor.

A MG output shaft which rotates together with the rotor RT of the motor generator MG is connected to an input shaft IS2 of the transmission mechanism 300. Therefore, MG torque Tmg which is output torque of the motor generator MG is transmitted to the input shaft IS2 of the transmission mechanism 300.

If the MG torque Tmg is transmitted to the input shaft IS2, the MG torque Tmg is converted in accordance with the gear unit of the transmission mechanism 300 and is outputted from an output shaft OS1 of the transmission mechanism 300. The MG torque Tmg outputted from the output shaft OS1 is outputted, together with the engine torque Te, to the left axle shaft SFL and the right axle shaft SFR via some kind of gear apparatus, the drive shaft DS and the differential DG.

The clutch CL is an electrically-controlled multi-plate wet clutch apparatus. The clutch CL has a pair of clutch plates, one clutch plate is connected to the crank shaft of the engine 200 as described above and another clutch plate is connected to the input shaft IS1 of the transmission mechanism 300. Therefore, if these clutch plates are coupled (engaged) to each other, the crank shaft of the engine 200 and the input shaft IS1 of the transmission mechanism 300 are mechanically connected. Incidentally, the clutch CL is an automated clutch whose control is automated by an action of a not-illustrated actuator. This actuator is electrically connected to the ECU 100 and a coupled/uncoupled state of two clutch plates in the clutch CL can be changed by the control of the ECU 100.

The transmission mechanism 300 is provided with the input shaft IS1, the input shaft IS2 and the output shaft OS1, and changes a transmission gear ratio, which is a ratio of a rotational speed of the input shaft IS1 and the input shaft IS2 and a rotational speed of the output shaft OS1, in accordance with a selected gear unit.

The transmission mechanism 300 is provided with: a forward gear unit which includes a first gear unit GR1, a second gear unit GR2, a third gear unit GR3, a fourth gear unit GR4 and MG gear unit GRMG; and a reverse gear unit GRR. The rotational speed of the first output shaft OS1 with respect to the rotational speed of the first input shaft IS1 in each forward gear unit is larger in the order of the fourth gear unit GR4, the third gear unit GR3, the second gear unit GR2 and the first gear unit GR1. Namely, in the first transmission mechanism 300, the first gear unit GR1 is the lowest speed gear unit and the fourth gear unit GR4 is the highest speed gear unit.

In the transmission mechanism 300, a connection state between the first gear unit GR1 and the output shaft OS1, a connection state between the second gear unit GR2 and the output shaft OS1, a connection state between the third gear unit GR3 and the output shaft OS1, a connection state between the fourth gear unit GR4 and the output shaft OS1, a connection state between the MG gear unit GRMG and the output shaft OS1 and a connection state between the reverse gear unit GRR and the output shaft OS1 are controlled by coupling mechanisms CP1, CP2, CP3, CP4, CPMG and CPR, respectively.

Namely, if the first gear unit GR1 is coupled to the output shaft OS1 by the coupling mechanism CP1, the first gear unit GR1 is the selected gear unit in the transmission mechanism 300. In a same manner, if the second gear unit GR2 is coupled to the output shaft OS1 by the coupling mechanism CP2, the second gear unit GR2 is the selected gear unit in the transmission mechanism 300. In a same manner, if the third gear unit GR3 is coupled to the output shaft OS1 by the coupling mechanism CP3, the third gear unit GR3 is the selected gear unit in the transmission mechanism 300. In a same manner, if the fourth gear unit GR4 is coupled to the output shaft OS1 by the coupling mechanism CP4, the fourth gear unit GR4 is the selected gear unit in the transmission mechanism 300. In a same manner, if the reverse gear unit GRR is coupled to the output shaft OS1 by the coupling mechanism CPR, the reverse gear unit GRR is the selected gear unit in the transmission mechanism 300. Moreover, if the MG gear unit GRMG is coupled to the output shaft OS1 by the coupling mechanism CPMG, the MG torque Tmg is transmitted to the output shaft OS1 in addition to the engine torque Te. Each coupling mechanism is electrically connected to the ECU 100 and such a configuration is used in which at least one of the coupling mechanism CPMG and at least one of the coupling mechanisms CP1 to CP4 and CPR couples the output shaft OS1 to each gear unit by the control of the ECU 100.

The output shaft OS1 of the transmission mechanism 300 is connected to the drive shaft DS. Therefore, in the hybrid driving apparatus 10, the engine torque Te of the engine 200 and the MG torque Tmg of the motor generator MG is transmitted to each of the left axle shaft SFL and the right axle shaft SFR via the transmission mechanism 300 and the differential DG.

(2) Fuel Cut Control Process and Vibration Suppress Control Process

Figure 3:
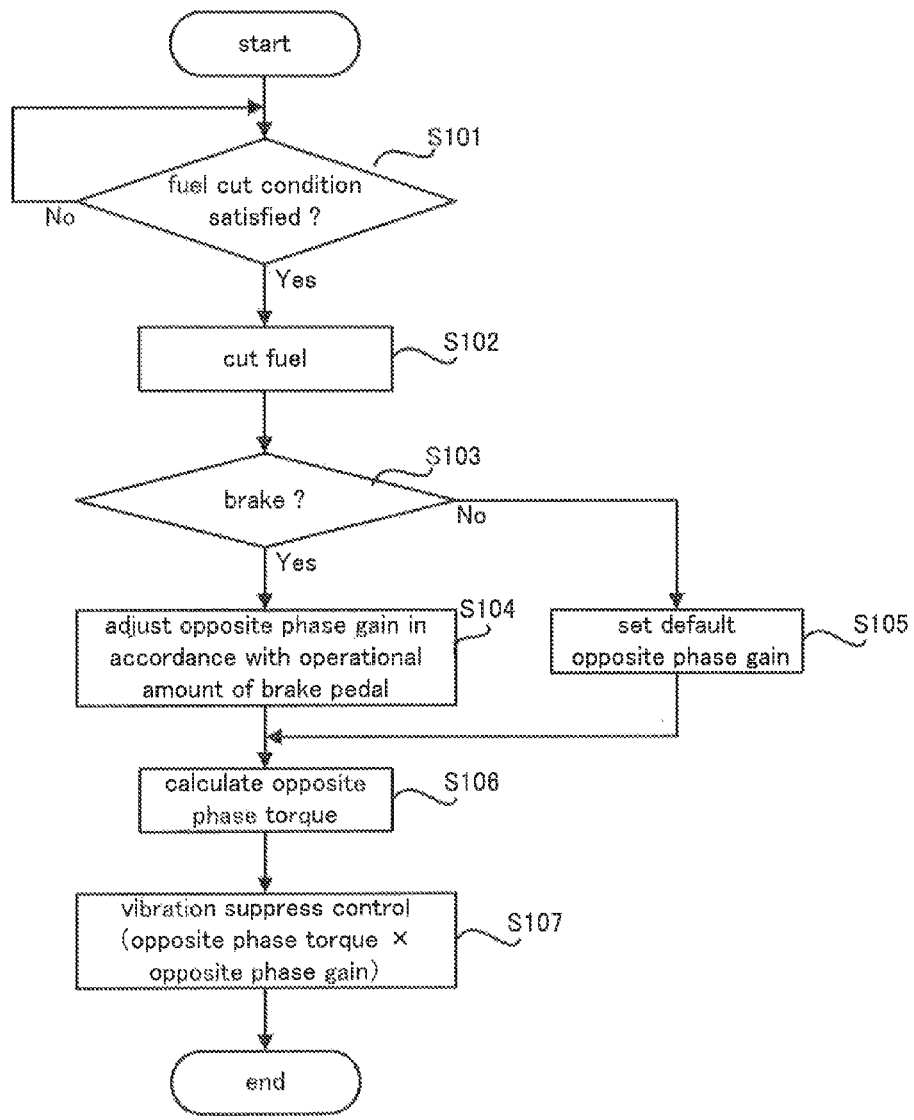
FIG. 3 is a flowchart illustrating one example of a flow of a fuel cut control process and a vibration suppress control process which are realized by the hybrid vehicle of the present embodiment.

Next, a flow of the fuel cut control process and the vibration suppress control process which are realized by the hybrid vehicle 1 of the present embodiment will be explained with reference to FIG. 3. FIG. 3 is a flowchart illustrating one example of the flow of the fuel cut control process and the vibration suppress control process which are realized by the hybrid vehicle 1 of the present embodiment.

As illustrated in FIG. 3, the ECU 100 determines whether or not a fuel cut condition is satisfied (step S101). As one example of the fuel cut condition, a condition in which the vehicle speed V of the hybrid vehicle 1 is equal to or more than a predetermined speed and an accelerator position is zero (alternatively, a position which can be substantially regarded as zero) is included. Thus, it is preferable that the ECU 100 determine whether or not the fuel cut condition is satisfied by referring to the vehicle speed V which is detected by the vehicle speed sensor 15 and the accelerator position which is detected by a not-illustrated accelerator position sensor. Incidentally, another condition may be used as the fuel cut condition. However, it is preferable that a condition which does not cause adverse effect on a usual or normal drive of the hybrid vehicle 1 be set as the fuel cut condition.

As a result of the determination in the step S101, if it is determined that the fuel cut condition is not satisfied (step S101: No), the operation for determining whether or not the fuel cut condition is satisfied is performed repeatedly and continuously.

On the other hand, as a result of the determination in the step S101, if it is determined that the fuel cut condition is satisfied (step S101: Yes), the ECU 100 controls an injector to cut (namely, stop) a supply of a fuel to the engine 200. As a result, the supply of the fuel to the engine 200 is cut (namely, stopped) (step S102). Due to such a cut of the supply of the fuel, fuel consumption can be improved.

Incidentally, the operation from the step S101 to the step S102 corresponds to the fuel cut control process. Subsequent to, in tandem with or in parallel with such a fuel cut control process, the vibration suppress control process from a step S103 to a step S107 is performed. Incidentally, the vibration suppress control process is a process for suppressing a vibration (alternatively, torque variation Tv of the engine 200 which causes the vibration) occurred in the hybrid vehicle 1 or each portion (for example, a driving system and the like) of the hybrid vehicle 1 due to the fuel cut control process.

In performing such a vibration suppress control process, the ECU 100 firstly determines whether or not a driver of the hybrid vehicle 1 operates (for example, presses) the brake pedal (step S103). Namely, the ECU 100 determines whether or not the hybrid vehicle 1 is put a brake on. In order to perform this determination, it is preferable that the ECU 100 refer to the operational amount B of the brake pedal which is detected by the brake sensor 14.

As a result of the determination in the step S103, if it is determined that the driver of the hybrid vehicle 1 operates the brake pedal (namely, the hybrid vehicle 1 is put a brake on) (step S103: Yes), the ECU 100 adjusts a opposite phase gain G in accordance with the operational amount B of the brake pedal (step S104). In order to adjust the opposite phase gain G, it is preferable that the ECU 100 refer to the operational amount B of the brake pedal which is detected by the brake sensor 14. Incidentally, the "opposite phase gain G" is a parameter for determining magnitude of suppress torque Tm outputted from the motor generator MG to cancel out or reduce the vibration which is caused by the fuel cut control process. By multiplying such an opposite phase gain G with the below described opposite phase torque Tc, the suppress torque Tm which the motor generator MG should output to cancel out or reduce the vibration which is caused by the fuel cut control process. Namely, the suppress torque Tm has a relationship in which the suppress torque Tm=the opposite phase torque Tc×the opposite phase gain G.

Figure 4:
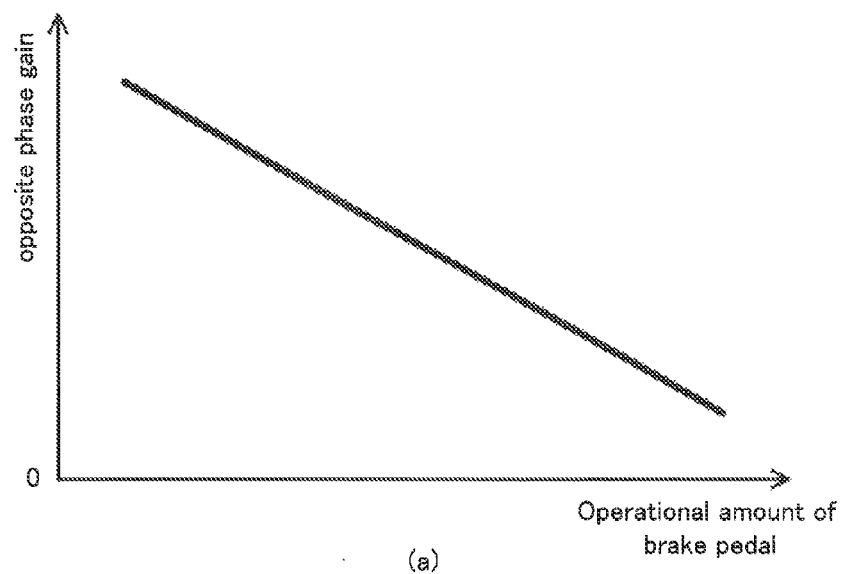
FIG. 4 is a graph illustrating a relationship between an operational amount of a brake pedal and an opposite phase gain.
Figure 4:
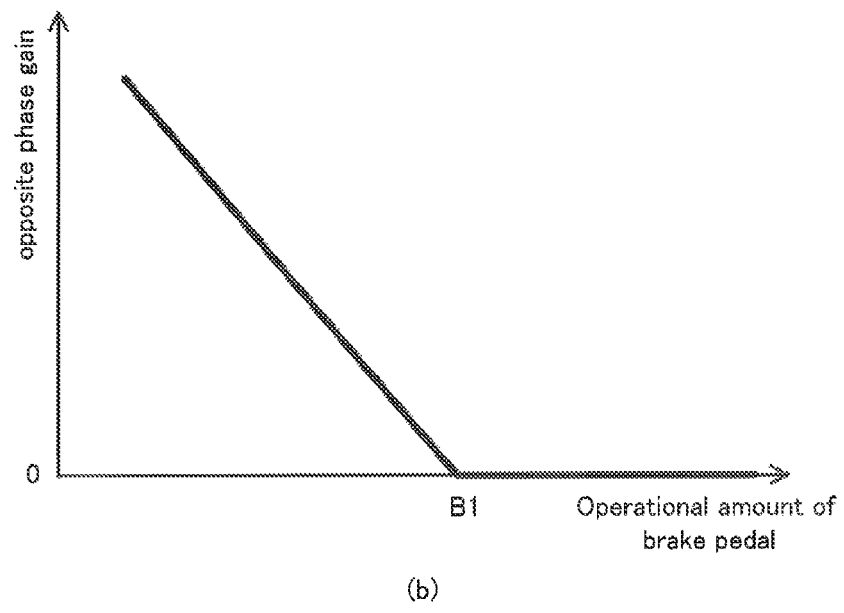

Here, the adjustment of the opposite phase gain G in accordance with the operational amount B of the brake pedal will be explained with reference to FIG. 4. FIG. 4 is a graph illustrating a relationship between the operational amount B of the brake pedal and the opposite phase gain G.

As illustrated in FIG. 4(a), the ECU 100 may adjust the opposite phase gain G such that the opposite phase gain G becomes smaller as the operational amount B of the brake pedal becomes larger.

Alternatively, as illustrated in FIG. 4(b), the ECU 100 may adjust the opposite phase gain G such that the opposite phase gain G becomes smaller as the operational amount B of the brake pedal becomes larger and the opposite phase gain G becomes zero if the operational amount B of the brake pedal is equal to or more than a predetermined amount B1. In this case, it is preferable that an appropriate value be set to the predetermined amount B1 by considering an adverse effect of the vibration caused by the fuel cut control process with respect to drivability. For example, a minimum value of the operational amount B of the brake pedal by which the vibration caused by the fuel cut control process does not cause the adverse effect with respect to drivability may be set to the predetermined amount B1.

Incidentally, FIG. 4(a) and FIG. 4(b) illustrate an example in which the opposite phase gain G is represented by a liner function whose variable is the operational amount B of the brake pedal. However, as long as the opposite phase gain G becomes smaller as the operational amount B of the brake pedal becomes larger, the opposite phase gain G may be represented by an arbitrary function. In addition, it is preferable that appropriate values be set to a specific value of the opposite phase gain G and a specific value of the operational amount B of the brake pedal by considering character or specification or the like of the hybrid vehicle 1.

Again in FIG. 3, on the other hand, as a result of the determination in the step S103, if it is determined that the driver of the hybrid vehicle 1 does not operate the brake pedal (namely, the hybrid vehicle 1 is not put a brake on) (step S103: No), the ECU 100 may not adjust the opposite phase gain G in accordance with the operational amount B of the brake pedal. In this case, the ECU 100 may set a default opposite phase gain G to the opposite phase gain G which is to be multiplied with the opposite phase torque in the below described step (step S105).

Subsequent to, in tandem with or in parallel with the operation from the step S103 to the step S105, the ECU 100 calculates the opposite phase torque Tc (step S106). In this case, the ECU 100 calculates, as the opposite phase torque Tc, a torque which is obtained by inverting (reversing) the torque variation Tv of the engine 200 which is caused by the fuel cut control process performed in the step S101 to the step S102 (namely, a torque whose phase is opposite to the phase of the torque variation Tv).

Then, the ECU 100 multiplies the opposite phase gain G adjusted in the step S104 or the opposite phase gain G set in the step S105 with the opposite phase torque Tc calculated in the step S106 (step S107). As a result, the suppress torque Tm (the opposite phase torque Tc×the opposite phase gain G) is calculated. Them the ECU 100 controls the motor generator MG to output the suppress torque Tm (step S107). As a result, the motor generator MG output the suppress torque Tm and the suppress torque Tm is transmitted to the input shaft IS2 which is connected to the rotating shaft of the motor generator MG. Thus, the vibration which is caused by the fuel cut control process can be canceled out or reduced. Namely, the vibration which is caused by the fuel cut control process can be suppressed.

Figure 5:
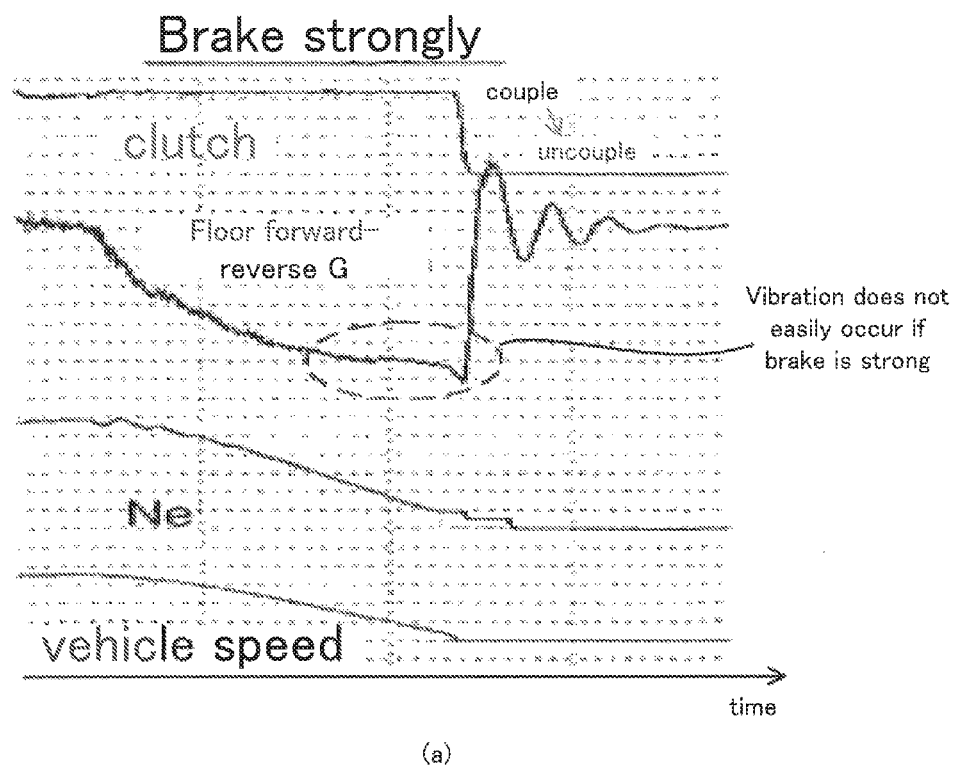
FIG. 5 is a graph illustrating a relationship between the operational amount of the brake pedal and a vibration occurring on the hybrid vehicle.
Figure 5:
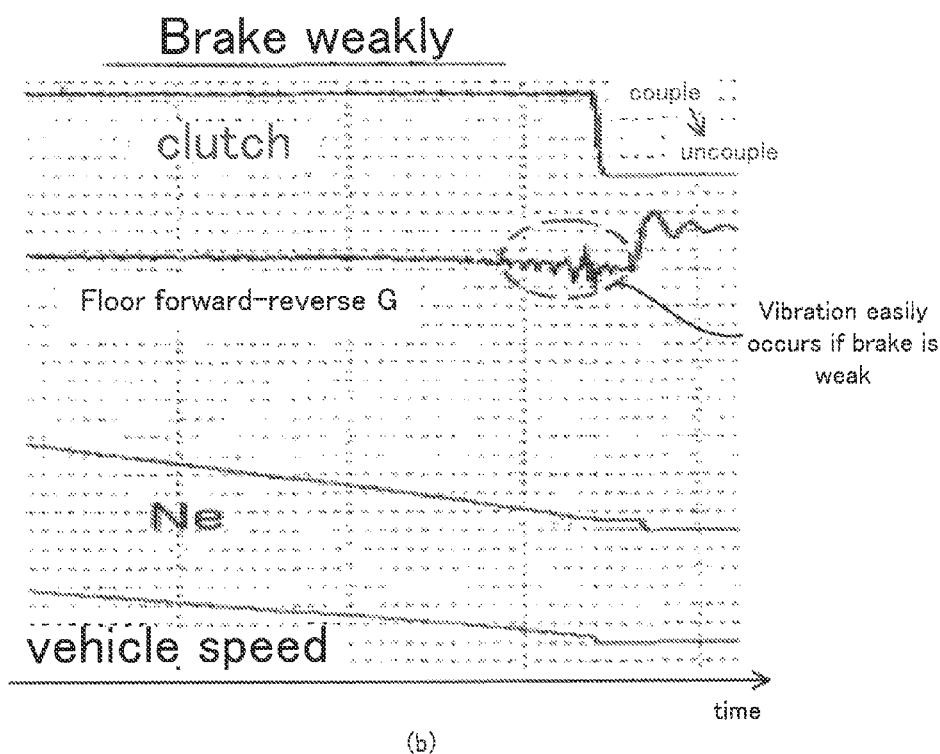

As explained above, according to the hybrid vehicle 1 of the present embodiment, the vibration suppress control process is performed such that the opposite phase gain G becomes smaller (namely, the magnitude of the suppress torque Tm becomes smaller) as the operational amount B of the brake pedal becomes larger. Hereinafter, a technical effect to make the opposite phase gain G become smaller as the operational amount B of the brake pedal becomes larger will be explained with reference to FIG. 5. FIG. 5 is a graph illustrating a relationship between the operational amount B of the brake pedal and the vibration occurring on the hybrid vehicle 1.

When the hybrid vehicle 1 decelerates, the motor generator MG sometimes regenerates the electric power while the engine 200 stops and thus the battery 12 is sometimes charged. However, if SOC of the battery 12 is relatively high, the engine 200 does not stop sometimes because the battery 12 cannot be charged. Even in this case where the hybrid vehicle 1 decelerates without stopping the engine 200, it is preferable that the fuel cut control process be performed for the purpose of improving the fuel consumption. More preferably, it is preferable that the fuel cut control process be performed until the hybrid vehicle 1 stops.

However, if the rotation number Ne of the engine 200 decreases with the deceleration of the hybrid vehicle 1, the vibration is caused by the above described fuel cut control process. This vibration can be suppressed by the above described vibration suppress control process. However, the inventor and the like of the present application found that an aspect of the vibration which is caused by the fuel cut control process varies depending on an aspect of the deceleration when the hybrid vehicle 1 decelerates without stopping the engine 200. Specifically, the inventor and the like of the present application found that the aspect of the vibration which is caused by the fuel cut control process varies depending on magnitude of the brake force which is added to the hybrid vehicle 1. More specifically, the inventor and the like of the present application found that the aspect of the vibration which is caused by the fuel cut control process varies depending on the operational amount B of the brake pedal when the driver operates the brake pedal. Hereinafter, the aspect of the vibration which is caused by the fuel cut control process in each of the case where the operational amount B of the brake pedal is relatively large (namely, the brake force is relatively large) and the case where the operational amount B of the brake pedal is relatively small (namely, the brake force is relatively small) will be explained.

FIG. 5(*a*) illustrates the aspect of the vibration which is caused by the fuel cut control process in the case where the hybrid vehicle 1 decelerates relatively strongly (namely, the operational amount B of the brake pedal is relatively large). Incidentally, in FIG. 5(*a*), as the vibration which is caused by the fuel cut control process, a forward-reverse G of the hybrid vehicle 1 (namely, an acceleration rate along a forward-reverse direction, and referred to as "floor forward-reverse G") is used for the explanation. As illustrated in FIG. 5(*a*), the vibration which is caused by the fuel cut control process (namely, the forward-reverse G of the hybrid vehicle 1) becomes smaller in the case where the operational amount B of the brake pedal is relatively large, compared to the case where the operational amount B of the brake pedal is relatively small (see FIG. 5(*b*)). Incidentally, FIG. 5(*a*) illustrates a state of the clutch CL, the rotation number Ne of the engine 200 and the vehicle speed V of the hybrid vehicle 1 for reference.

On the other hand, FIG. 5(*b*) illustrates the aspect of the vibration which is caused by the fuel cut control process in the case where the hybrid vehicle 1 decelerates relatively weakly (namely, the operational amount B of the brake pedal is relatively small). Incidentally, also in FIG. 5(*b*), as in FIG. 5(*a*), the forward-reverse G of the hybrid vehicle 1 is used for the explanation as the vibration which is caused by the fuel cut control process. As illustrated in FIG. 5(*b*), the vibration which is caused by the fuel cut control process (namely, the forward-reverse G of the hybrid vehicle 1) becomes larger in the case where the operational amount B of the brake pedal is relatively small, compared to the case where the operational amount B of the brake pedal is relatively large (see FIG. 5(*a*)). Incidentally, FIG. 5(*b*) illustrates a state of the clutch CL, the rotation number Ne of the engine 200 and the vehicle speed V of the hybrid vehicle 1 for reference.

Considering the relationship between the operational amount B of the brake pedal and the vibration which is caused by the fuel cut control process (namely, the forward-reverse G of the hybrid vehicle 1), the suppress torque Tm is not necessarily so large in the case where the operational amount B of the brake pedal is relatively large, compared to the case where the operational amount B of the brake pedal is relatively small. Because the vibration which is caused by the fuel cut control process is smaller in the case where the operational amount B of the brake pedal is relatively large, compared to the case where the operational amount B of the brake pedal is relatively small. On the other hand, it is preferable that the suppress torque Tm be large to some extent in the case where the operational amount B of the brake pedal is relatively small, compared to the case where the operational amount B of the brake pedal is relatively large. Because the vibration which is caused by the fuel cut control process is larger in the case where the operational amount B of the brake pedal is relatively small, compared to the case where the operational amount B of the brake pedal is relatively large.

From such a view point, the ECU 100 of the present embodiment adjust the magnitude of the suppress torque Tm (namely, the opposite phase gain G) such that the suppress torque Tm becomes smaller as the operational amount B of the brake pedal becomes larger (alternatively, the suppress torque Tm becomes zero if the operational amount B of the brake pedal is equal to or more than the predetermined amount B1). Therefore, it is appropriately prevented that the motor generator MG outputs the excessive large suppress torque Tm in the case where the vibration which is caused by the fuel cut control process is relatively small. Thus, the SOC of the battery 12 for operating the motor generator MG is not deteriorated beyond necessity or unnecessarily. As described above, according to the hybrid vehicle 1 of the present embodiment, the vibration which is caused by the fuel cut control process can be appropriately suppressed even when the hybrid vehicle 1 decelerates. Namely, according to the hybrid vehicle 1 of the present embodiment, the vibration which is caused by fuel cut control process when the hybrid vehicle 1 decelerates can be appropriately suppressed without deteriorating the SOC of the battery 12 beyond necessity or unnecessarily.

Incidentally, in the above explanation, the ECU 100 adjusts the opposite phase gain G in accordance with the operational amount B of the brake pedal. However, the ECU 100 may adjust the opposite phase gain G in accordance with an arbitrary detected value which is outputted from the brake sensor 14 in addition to or instead of the operational amount B of the brake pedal. Alternatively, the ECU 100 may adjust the opposite phase gain G in accordance with an arbitrary parameter which directly or indirectly represents the brake force or the brake amount of the brake. As one example of the arbitrary parameter which directly or indirectly represents the brake force or the brake amount of the brake, for example, a parameter which specifies the operation of the brake actuator BRA (for example, the pressure of the brake fluid, operational amount of each unit included in the brake actuator BRA and the like) is included.

Figure 6:
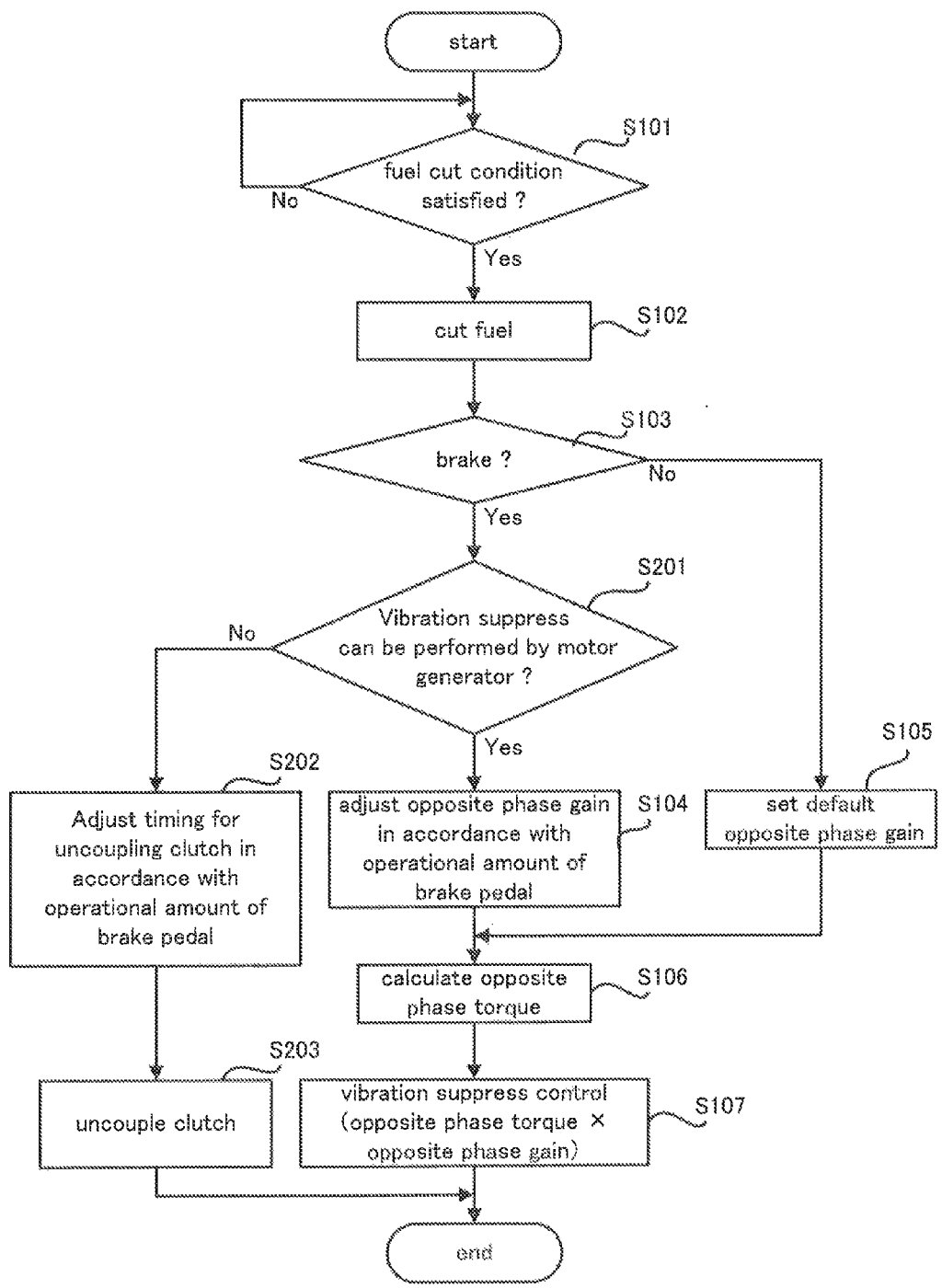
FIG. 6 is a flowchart illustrating another example of a flow of the fuel cut control process and the vibration suppress control process which are realized by the hybrid vehicle of the present embodiment.

(3) Modified Example of Fuel Cut Control Process and Vibration Suppress Control Process Next, a flow of a modified example of the fuel cut control process and the vibration suppress control process which are realized by the hybrid vehicle 1 of the present embodiment will be explained with reference to FIG. 6. FIG. 6 is a flowchart illustrating another example of the flow of the fuel cut control process and the vibration suppress control process which are realized by the hybrid vehicle 1 of the present embodiment.

As illustrated in FIG. 6, also in the modified example, the fuel cut control process from the step S101 to the step S102 is performed in a same manner as the operation illustrated in FIG. 3.

Then, also in the modified example, the ECU 100 determines whether or not the driver of the hybrid vehicle 1 operates (for example, presses) the brake pedal (step S103).

As a result of the determination in the step S103, if it is determined that the driver of the hybrid vehicle 1 does not operate the brake pedal (namely, the hybrid vehicle 1 is not put a brake on) (step S103: No), the operation from the step S105 to the step S107 are performed in a same manner as the operation in FIG. 3. Namely, the ECU 100 set the default opposite phase gain G (step S105), calculates the opposite phase torque Tc (step S106) and control the motor generator MG to output the suppress torque Tm (step S107).

On the other hand, as a result of the determination in the step S103, if it is determined that the driver of the hybrid vehicle 1 operates the brake pedal (namely, the hybrid vehicle 1 is put a brake on) (step S103: Yes), the ECU 100 determines whether or not the vibration suppress control process can be performed by the motor generator MG (step S201). Namely, the ECU 100 determines whether or not the motor generator MG can output the suppress torque Tm. As one example of the case where the vibration suppress control process cannot be performed by the motor generator MG, the case where the SOC of the battery 12 is equal to or less than a predetermined value, the case where the motor generator MG is broken down and the like are included.

As a result of the determination in the step S201, if it is determined that the vibration suppress control process can be performed by the motor generator MG (step S201: Yes), the operation from the step S104 and the step S106 to the step S107 are performed in a same manner as the operation in FIG. 3. Namely, the ECU 100 adjust the opposite phase gain G in accordance with the operational amount B of the brake pedal (step S104), calculates the opposite phase torque Tc (step S106) and control the motor generator MG to output the suppress torque Tm (step S107).

On the other hand, as a result of the determination in the step S201, if it is determined that the vibration suppress control process cannot be performed by the motor generator MG (step S201: No), the ECU 100 performs a control for suppressing the vibration which is caused by the fuel cut control process by uncoupling (throwing out) the clutch CL, instead of suppressing the vibration which is caused by the fuel cut control process by outputting the suppress torque Tm from the motor generator MG. Namely, the ECU 100 performs a control for preventing the vibration due to the torque variation Tv of the engine which is caused by the fuel cut control process from transmitting from the engine 200 to the hybrid vehicle 1 or each unit (for example, the driving system and the like) of the hybrid vehicle 1 by uncoupling the clutch CL.

However, when the clutch CL is uncoupled, it is desirable that the fuel cut control is stopped (namely, the fuel starts to be supplied to the engine 200 again) in order to prevent the stop of the engine 200 (namely, stall). However, from a view point of improving the fuel consumption, it is preferable that timing when the clutch CL is uncoupled get delayed. Because the more the timing when the clutch CL is uncoupled get delayed, the longer the fuel cut control process is performed and thus the more the fuel consumption can be improved. Therefore, in the present embodiment, considering the above described relationship between the operational amount B of the brake pedal and the vibration which is caused by the fuel cut control process, the ECU 100 adjusts the timing when the clutch CL is uncoupled in accordance with the operational amount B of the brake pedal.

Figure 7:
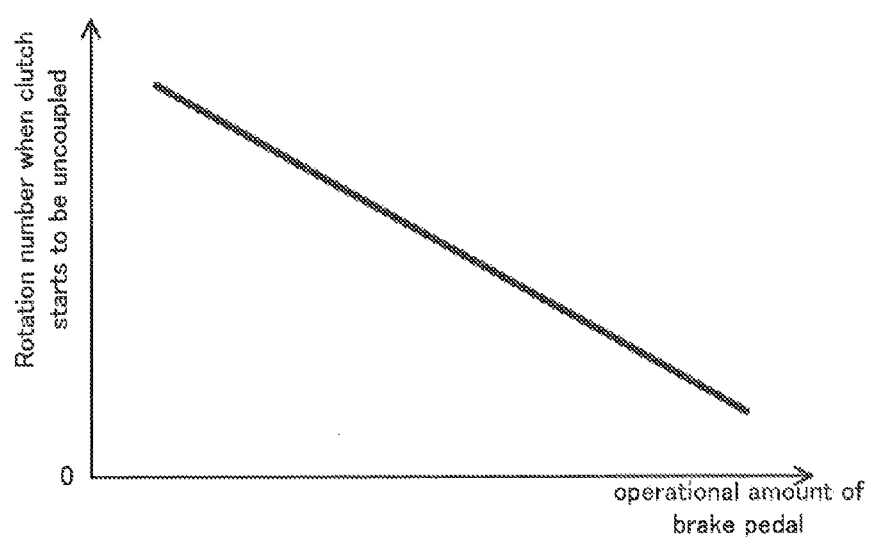
FIG. 7 is a graph illustrating a relationship between the operational amount of the brake pedal and timing when a clutch is uncoupled.

Here, the adjustment of the timing when the clutch CL is uncoupled in accordance with the operational amount B of the brake pedal will be explained with reference to FIG. 7. FIG. 7 is a graph illustrating a relationship between the operational amount B of the brake pedal and the timing when the clutch CL is uncoupled.

Incidentally, in the present embodiment, the timing when the clutch CL is uncoupled is determined by the rotation number Ne of the engine 200. Specifically, the timing when the clutch CL is uncoupled corresponds to timing when the rotation number Ne of the engine 200 becomes equal to or less than a predetermined threshold value. In other words, the timing when the rotation number Ne of the engine 200 becomes equal to or less than the predetermined threshold value is the timing when the clutch CL is uncoupled. In FIG. 7, under such an assumption, the adjustment of the timing when the clutch CL is uncoupled in accordance with the operational amount B of the brake pedal will be explained.

As illustrated in FIG. 7, the ECU 100 may adjust the timing when the clutch CL is uncoupled such that the predetermined threshold value (namely, the rotation number of the engine 200) which defines the timing when the clutch CL is uncoupled becomes smaller as the operational amount B of the brake pedal becomes larger. Incidentally, the timing when the clutch CL is uncoupled is shifted to the delaying direction more as the predetermined threshold value (namely, the rotation number of the engine 200) which defines the timing when the clutch CL is uncoupled becomes smaller. Therefore, the ECU 100 may adjust the timing when the clutch CL is uncoupled such that the timing when the clutch CL is uncoupled is shifted to the delaying direction more as the operational amount B of the brake pedal becomes larger. Namely, the ECU 100 may adjust the timing when the clutch CL is uncoupled such that the timing when the clutch CL is uncoupled gets delayed more as the operational amount B of the brake pedal becomes larger. Namely, the ECU 100 may adjust the timing when the clutch CL is uncoupled such that an amount of a delay of the actual timing when the clutch CL is uncoupled with respect to the standard (normal) timing when the clutch CL is uncoupled becomes larger as the operational amount B of the brake pedal becomes larger.

Incidentally, the "delay of the timing when the clutch CL is uncoupled" means the delay of the adjusted timing when the clutch CL is uncoupled in the case where the brake pedal is operated by same operational amount AB with respect to the non-adjusted timing when the clutch CL is uncoupled (namely, the standard timing when the clutch CL is uncoupled) in the case where the brake pedal is operated by a certain operational amount AB. Namely, it means the delay of the adjusted timing when the clutch CL is uncoupled with respect to the non-adjusted timing when the clutch CL is uncoupled under the condition in which the brake pedal is operated in a same manner. The amount of this delay becomes larger as the operational amount B becomes larger.

Again in FIG. 6, then, the ECU 100 uncouples the clutch CL at the timing which is adjusted in the step S202 (namely, at the timing when the rotation number Ne of the engine 200 becomes less than the threshold value which is adjusted in the step S202) (step S203). In order to perform this process, it is preferable that the ECU 100 refer to the rotation number Ne of the engine 200 which is detected by the rotation number sensor 13.

The modified example which is illustrated in FIG. 6 can also receive an effect which is same as some kind of effect which the operation illustrated in FIG. 3 can receive. In addition, according to the modified example, even when the motor generator MG cannot output the suppress torque Tm due to some kind of reason, the vibration which is caused by the fuel cut control process when the hybrid vehicle 1 decelerates can be appropriately suppressed by uncoupling the clutch CL. In this case, the timing when the clutch CL is uncoupled in accordance with the operational amount B of the brake pedal. Therefore, the vibration which is caused by the fuel cut control process when the hybrid vehicle 1 decelerates can be appropriately suppressed by uncoupling the clutch CL at the appropriate timing while the fuel consumption can be improved by keeping performing the fuel cut control process as long as possible.

The present invention is not limited to the aforementioned embodiments, but various changes may be made, if desired, without departing from the essence or spirit of the invention which can be read from the claims and the entire specification. A control apparatus for a hybrid vehicle, which involves such changes, is also intended to be within the technical scope of the present invention.

DESCRIPTION OF REFERENCE SIGNS 1 hybrid vehicle
10 hybrid driving apparatus
100 ECU
200 engine
CL first clutch
MG motor generator

The invention claimed is:

1. A control apparatus for a hybrid vehicle, wherein the hybrid vehicle is provided with an engine which operates by a burning of fuel and a rotating electrical machine which operates by using electric power charged in a battery,
   the control apparatus is configured to:
   stop a supply of the fuel to the engine while the hybrid vehicle is running;
   control the rotating electrical machine so as to generate a suppress force for suppressing vibration which is caused by a stop of the supply of the fuel to the engine; and
   adjust the magnitude of the suppress force such that the magnitude of the suppress force becomes smaller as a braking amount for braking the hybrid vehicle becomes larger.

2. The control apparatus for the hybrid vehicle according to claim 1, wherein
   the control apparatus is configured to adjust the magnitude of the suppress force such that the magnitude of the suppress force becomes zero if the braking amount is equal to or more than a predetermined amount.

3. The control apparatus for the hybrid vehicle according to claim 1, wherein
   the suppress force is calculated by multiplying suppress torque whose phase is opposite to a phase of a variation of a torque of the engine with the stop of the supply of the fuel to the engine by a suppress gain which determines the magnitude of the suppress force,
   the control apparatus is configured to adjust the magnitude of the suppress force by adjusting the suppress gain such that the suppress gain becomes smaller as the braking amount becomes larger.

4. The control apparatus for the hybrid vehicle according to claim 3, wherein
   the control apparatus is configured to adjust the magnitude of the suppress force by adjusting the suppress gain such that the suppress gain becomes zero if the braking amount is equal to or more than a predetermined amount.

5. The control apparatus for the hybrid vehicle according to claim 1, wherein
   the hybrid vehicle is further provided with a clutch mechanism which couples and uncouples a connection between the engine and a drive shaft which transmits a driving power of the engine to a wheel of the hybrid vehicle,
   the control apparatus is further configured to control the clutch mechanism to uncouple the connection between the engine and the drive shaft when the rotating electrical machine cannot generate the suppress force, the control apparatus is configured to adjust a timing when the connection between the engine and the drive shaft is uncoupled depending on the braking amount.

6. The control apparatus for the hybrid vehicle according to claim 5, wherein the control apparatus is configured to adjust the timing when the connection between the engine and the drive shaft is uncoupled such that the timing when the connection between the engine and the drive shaft is uncoupled gets delayed more as the braking amount becomes larger.

\* \* \* \* \*